(12) United States Patent
Tamura

(10) Patent No.: US 7,706,801 B2
(45) Date of Patent: Apr. 27, 2010

(54) COMMUNICATION SYSTEM AND ALIGNMENT METHOD OF TRANSCODER

(75) Inventor: Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 555 days.

(21) Appl. No.: 11/525,181

(22) Filed: Sep. 22, 2006

(65) Prior Publication Data

US 2007/0123197 A1 May 31, 2007

Related U.S. Application Data

(63) Continuation of application No. 09/935,675, filed on Aug. 24, 2001, now Pat. No. 7,181,209.

(30) Foreign Application Priority Data

Dec. 13, 2000 (JP) ............................. 2000-379106

(51) Int. Cl.
*H04W 36/00* (2009.01)
(52) U.S. Cl. ...................... 455/439; 455/438; 455/442
(58) Field of Classification Search .......... 455/436–444
See application file for complete search history.

(56) References Cited

U.S. PATENT DOCUMENTS

| 5,608,779 | A | 3/1997 | Lev et al. |
|---|---|---|---|
| 5,682,416 | A | 10/1997 | Schmidt et al. |
| 5,867,784 | A | 2/1999 | Lantto |
| 5,953,666 | A | 9/1999 | Lehtimaki |
| 6,009,328 | A | 12/1999 | Muszynski |
| 6,108,560 | A | 8/2000 | Navaro et al. |
| 6,349,197 | B1 * | 2/2002 | Oestreich ................... 455/63.1 |
| 6,556,844 | B1 | 4/2003 | Mayer |
| 6,633,536 | B1 | 10/2003 | Suvanen |
| 2003/0032440 | A1 | 2/2003 | Sato et al. |

OTHER PUBLICATIONS

3rd Generatoin Partnership Project (3G TS 25.415 versioon 3.0.0), Oct. 1999.*
Siemens, "Through Connection and In User Plane Initialization during TrFO establishment", TrFO/TFO Workshop #2, Jul. 18, 2000, Helsinki, Finland.
NEC, "SRNS Relocation During the TrFO Connection", TrFO Workshop, Aug. 28, 2000, Seattle, USA.
Tdoc N4-000476 by Siemens (IDS).
TRFO break—Message Sequence Charts, Tdoc N4-000868, Siemens, Oct. 16, 2000.

* cited by examiner

*Primary Examiner*—Simon Sing
(74) *Attorney, Agent, or Firm*—McGinn IP Law Group PLLC

(57) ABSTRACT

When a terminal is moved to an area covered by a different switching node RNC of a radio access network, degradation of speech quality is prevented by returning a transcoder insertion connection to a transcoder-free-operation connection. When the terminal is moved and the switching node RNC of the radio access network is changed, a relocation is performed by inserting the transcoder, re-confirmation of parameter information of a bandwidth-compression coding system is requested for a local side switching node RNC and a remote side switching node RNC and, when the transcoder can be bypassed according to the confirmation, the transcoder is removed to return to the transcoder-free-operation connection mode.

21 Claims, 8 Drawing Sheets

COMMUNICATION SYSTEM AND ALIGNMENT METHOD OF TRANSCODER

The present Application is a Continuation Application of U.S. patent application Ser. No. 09/935,675, filed on Aug. 24, 2001 now U.S. Pat. No. 7,181,209.

BACKGROUND OF THE INVENTION

1. Field of the Invention

The present invention relates to an interface between a network for transmitting a bandwidth-compressed signal and a network for transmitting non-bandwidth-compressed signal. Particularly, in an interface between a switching node of a radio access network for transmitting a bandwidth-compressed audio signal and a switching node of a core network for transmitting a non-bandwidth-compressed audio signal opposing to the radio access network in a communication network to which the radio access network and the core network are connected, the present invention relates to an insertion/removal control of a transcoder provided in the switching node of the core network for decoding the bandwidth-compressed audio signal transmitted in the radio access network. The switching node of the radio access network is referred to as RNC (Radio Network Controller). As the switching node of the core network having a transcoder, a MSC (Mobile Switching Center) having a switching function and a MGW (Media Gateway Server) having a gateway switching function are known. Although the MSC and MGS are different from each other in view of their functions in the core network, the MSC and MGS operate in the same way in view of the insertion/removal control of the transcoder. Therefore, in the following description, the MSC will be described as a typical example of the switching node of the core network, which includes the transcoder.

2. Description of the Related Art

As a new mobile communication system, a system, which is constructed with a core network constructed as a fixed network for performing a position control, a call control and a service control and a radio access network for terminating a radio technology and having an interface between the switching node RNC of the radio access network and the switching node MSC of the core network defined as Iu interface, has been proposed. The Iu interface is defined as a hierarchic structure including a control plane for exchanging control signals between switching nodes and a user plane for exchanging transmission signals and control signals between users. The user plane is constructed with a transmission portion for transmitting a transmission signal such as an audio signal and/or data as AAL2 cell in ATM and a control signal portion for performing a negotiation between users. When a communication is performed between a calling terminal and a called terminal, the audio signal and/or the data signal is transmitted as a packet signal in ATM after a negotiation between the terminals is performed through the user plane.

The audio signal is transmitted as a 64 kbps PCM signal within the core network, since, in the core network, there are communications with a fixed cable telephone network and communications with other radio access networks. This is because the audio signal is standardized such that it is transmitted as the 64 kbps PCM signal by taking the cable telephone network and the interface with respect to other networks into consideration. On the other hand, in order to effectively utilize radio frequency, which is finite resource, the audio signal to be transmitted is bandwidth-compressed. A codec for bandwidth-compressing the audio signal is provided in each terminal so that the audio signal is transmitted in the radio access network as a narrow band signal of, for example, 9.6 kbps. Therefore, a transcoder (TC) for converting a bandwidth-compressed audio signal into a 64 kbps PCM signal, transmitting the latter to the side of the core network or converting a 64 kbps PCM signal into a bandwidth-compressed audio signal and transmitting the latter to the radio access network is provided in the switching node MSC of the core network to perform the conversion between the bandwidth-compressed audio signal and the 64 kbps PCM signal. FIG. 9 shows a construction for converting the bandwidth-compressed audio signal into the 64 kbps PCM signal and transmitting the latter signal.

In FIG. 9, DHT (Diversity Handover Trunk) is provided in the switching node RNC on each of a calling side and a called side to play a hand-over function in a state of diversity.

Assuming that the called side is a radio terminal utilizing the same audio compression coding system, the audio signal is coded/decoded by at least four coding/decoding devices in the passage from the calling side to the called side, that is, a codec of the calling terminal, a transcoder of the switching node MSC on the calling side, a transcoder of the switching node of the called terminal and a codec of the called terminal. Therefore, distortion of the transmission signal due to the coding/decoding method is accumulated, resulting in a degraded audio signal quality. If transcoders are inserting into all channels of the switching node MSC, the cost therefor becomes high and a signal delay may occur due to the signal conversions.

In a case where one audio compression coding system is used in the mobile communication network, the calling and called terminals have identical codecs. Therefore, there is no need of converting the bandwidth-compressed signal into the 64 kbps PCM signal by using the transcoder of the switching node MSC. That is, there is no problem if the audio signal is transmitted as a bandwidth compression coded, narrow band signal within the core network without using the transcoder. In such case, it is possible to reduce the installation cost of transcoders and, further, the quality of the audio signal can be improved since the number of coding/decoding steps to be performed in the communication is reduced. Therefore, in the mobile communication network using one and the same compression coding system, a system has been employed in which a bandwidth-compressed audio signal is transmitted as it is by bypassing the transcoder in the switching node of the core network. This system is referred to as Transcoder Free Operation (TrFO).

FIG. 10 shows a connection for the Transcoder Free Operation.

In the above mentioned new mobile communication system, it has been proposed to use an AMR (Adaptive Multi Rate Codec) as the compression coding system. The AMR can determine its conversion rate dynamically in a range from 4.75 kbps to 12.2 kbps, for example. Further, the class of AMR is assigned dependent upon tolerable error rate and the assignment of the coding frame of the AMR is performed by transmitting a RFCI (Rab sub-Flow Combination Identifier) information assigning a SDU (Service Data Unit) size of a table describing the conversion type between users by using the user plane and negotiating mutually between the calling terminal and the called terminal.

As mentioned, in the Transcoder Free Operation using the AMR compression coding system, the RFCI information for compression-coding is determined by users in the user plane of the interface between the switching node MSC of the core network and the switching node RNC of the radio access network. Therefore, when the transcoder is inserted in a communication path, the switching node MSC of the core network must insert the transcoder by executing initializing procedures between the switching node MSC and the switching node RNC of the radio access network.

It is assumed that a communication between a calling terminal and a called terminal is performed by bypassing a transcoder in a switching node MSC using the TrFO connection. In such case, one of the terminal, which is moving, enters into an area covered by a switching node RNC of a different radio access network while switching a base station by the hand-over. This state is shown in FIG. 9. In this case, there may be a case where the terminal moves to a switching node RNC of a different communication carrier. For example, in Europe, there may be a communication crossing national boundaries. In such case, when relocation is performed to a switching node RNC of a different carrier, it may be impossible to continue the TrFO connection since the same RFCI information is not always used.

In such case, it is necessary to initialize a local side switching node MSC, that is, the relocating terminal side, of a core network by inserting a transcoder, convert an audio signal into a standard 64 kbps PCM signal, further convert the latter into a bandwidth-compressed signal corresponding to a remote terminal side and transmit the bandwidth-compressed signal to the remote terminal side. This is because there is no guarantee that the same RFCI information for the bandwidth-compression as that previously used can be used for a new switching node RNC.

As described, when a terminal moves to a switching node RNC of a new radio access network under the TrFO connection, a transcoder is inserted by performing an initialization of transcoder with respect to the switching node of the new radio access network.

Therefore, when the terminal enters into the area covered by the new switching node RNC and the transcoder in the switching node MSC is inserted, it is necessary to insert at least four coding/decoding devices as mentioned previously and degradation of tone quality can not be avoided.

In order to solve this problem, a method has been proposed (Through Connection and Iu User Plane Initialization during TrFO establishment 2000.7.16 Siemens 3GPP TSG CN WG4#03 TdocN4-00476). In the proposed method, a TrFO connection between a switching node RNC of a radio access network on a remote side in which a terminal is not moved and a switching node MSC of a core network is kept continued and a negotiation is performed between the switching node MSC of the core network and the switching node RNC of the new radio access network on the side of the moving terminal by inserting a transcoder to inquire of the new switching node about RFCI information. When the RFCI information is the same as that used in the previous communication and satisfies the TrFO condition, the system is controlled such that it is shifted to the TrFO.

In this proposal, however, the procedure for shifting the TrFO by inserting/removing the transcoder is complicated, compared with the system in which the negotiation is performed after the re-initialization is performed once. That is, when a negotiation is performed between the new switching node RNC of the radio access network and the switching node MSC of the core network and the RFCI information is different from that used for the previous TrFO connection, a re-initialization including the remote side switching node RNC becomes necessary, so that the procedure therefor becomes complicated.

SUMMARY OF THE INVENTION

The present invention was made to solve such problem as mentioned above and an object of the present invention is to provide a communication system, which is capable of returning to a TrFO connection call for bypassing a transcoder of a switching node MSC of a core network immediately after a terminal is moved to an area covered by a switching node RNC of a radio access network, an alignment method of the transcoder and a switching node.

Another object of the present invention is to provide a communication system in which service degradation, such as delay of connection and/or instantaneous cut-off of sound, caused by insertion of a transcoder when a terminal is switched to a switching node RNC, an alignment method of transcoder and a switching node.

Another object of the present invention is to provide a communication system in which a procedure for relocation of a switching node is simple, an alignment method of transcoder and a switching node.

The reason for the insertion of a transcoder in a switching node MSC of a core network into a TrFO connection call at a time of relocation of a switching node RNC is that a RFCI information used with respect to an old switching node RNC is not always used for a new switching node RNC. If the RFCI information for the new switching node on an input side of the inserted transcoder is the same as that used for the old switching node on an output side of the transcoder, AMR data can be transmitted simply without necessity of a format conversion of AMR data (decoding on the input side and coding on the output side). Therefore, it is possible to return to the TrFO connection by bypassing the transcoder.

The present invention is featured by that, when a transcoder of a switching node MSC of a core network is inserted at a time of relocation of a switching node RNC, the switching node MSC inquires of the switching node RNC of a radio access network about whether or not a setting information of the inserted transcoder can be initialized by using a RFCI information, which is the same on both input and output sides of the transcoder to allow a bypassing of the transcoder, and the transcoder is removed and the system is returned to a TrFO connection when the switching node RNC is initialized such that the RFCI information on the input side of the transcoder becomes the same as that on the output side of the transcoder. Therefore, it is possible to use the TrFO connection, which provides a high tone quality, in a new switching node to which a terminal is moved.

Since the RFCI information assigned by the initialization processing is to assign a format of AMR data toward the new switching node, the purpose of this system is to assign the RFCI information to the new switching node RNC by the initialization processing from the switching node MSC such that the RFCI information on the input side of the transcoder becomes the same as that on the output side of the transcoder.

Incidentally, it is possible that the inquiry from the switching node MSC of the core network to the switching node of the radio access network can be performed by not the user plane of Iu interface but the control plane thereof.

That is, the communication system according to present invention is featured by comprising a first network for transmitting non-band-compressed signal and a second network for transmitting a bandwidth-compressed signal, wherein a switching node of the first network includes a transcoder for performing a conversion between the bandwidth-compressed signal and the non-bandwidth-compressed signal and has a first mode in which the transcoder is inserted and a signal transmission is performed by performing the conversion between the bandwidth-compressed signal and the non-bandwidth-compressed signal and a second mode in which the bandwidth-compressed signal is transmitted as it is without the transcoder, and wherein the switching node of the first network includes means, which, when a terminal is moved to an area of a new switching node of the second network during the second mode, inserts the transcoder, inquires of the switching node of the second network about whether or not a setting information of the transcoder can be changed to a setting information for the second mode and, when there is an acknowledge from the switching node of the second network, changes the mode to the second mode.

Further, the communication system according to present invention is featured by comprising a radio access network for transmitting an audio signal as a bandwidth-compressed signal and a core network for transmitting an audio signal as a non-bandwidth-compressed signal, wherein a switching node of the core network includes a transcoder for performing a conversion between the bandwidth-compressed signal and the non-bandwidth-compressed signal and has a TrFO connection mode in which the audio signal is transmitted/received between a calling terminal and a called terminal as the bandwidth-compressed signal without using the transcoder by a negotiation between the terminals and wherein the switching node of the core network includes means, which performs a communication between the calling and called terminals in the TrFO connection mode and, when one of the calling and called terminals is moved to an area of a switching node of a new radio access network, inserts the transcoder for the switching node of the new radio access network, means for inquiring, after the transcoder is inserted, of the switching node of the new radio access network about whether or not a setting information of the transcoder can be changed to a setting information with which a signal format on an input side of the transcoder becomes the same as that on an output side thereof and means for changing the mode between the switching node of the core network and the switching node of the new radio access network to the TrFO connection mode when there is an acknowledge from the switching node of the new radio access network.

In this communication system, the audio signal bandwidth-compression system in the radio access network may be AMR (Adaptive Multi Rate Coding) system, the setting information for bandwidth-compression may be RFCI information indicative of a value of a mapping table for determining a conversion rate of an audio signal coding frame in the AMR system and the inquiry of the switching node of the radio access network may be to inquiring whether or not the setting information is RFCI information whose parameter on an input side of the transcoder is equal to a parameter on an output side of the transcoder.

The inquiry of the setting information may use a user plane of Iu interface defined as an interface between the switching node of the core network and the switching node of the radio access network.

Further, the communication system according to present invention is featured by comprising a radio access network for transmitting an audio signal as a bandwidth-compressed signal and a core network for transmitting an audio signal as a non-bandwidth-compressed signal, the switching node of the core network including a transcoder for performing a conversion between the bandwidth-compressed signal and a non-bandwidth-compressed signal and a communication being performed in a first mode for transmitting a signal by inserting the transcoder and performing the conversion between the bandwidth-compressed signal and the non-bandwidth-compressed signal and in a second mode for transmitting the bandwidth-compressed signal without using the transcoder, wherein, when, in a communication between a calling terminal and a called terminal in the second mode, one of the calling terminal and the called terminal is moved to an area of a switching node of a new radio access network, the switching node of the core network inserts the transcoder to change the mode to the first mode, inquires of the switching node of the new radio access network about whether or not a setting information of the transcoder can be changed to a setting information of the transcoder such that the setting information on an input side of the transcoder becomes the same as that on an output side thereof and, when the setting information on the input side of the transcoder is the same as that on the output side thereof, changes the mode to the second mode.

The inquiry of the setting information may use a protocol of a user plane of Iu interface defined as an interface between the switching node of the core network and the switching node of the radio access network and the setting information of the transcoder may be a RFCI information of the AMR coding system.

In a switching node operable in a first mode for performing a conversion between a bandwidth-compressed signal and a non-bandwidth-compressed signal by inserting a transcoder and a second mode for transmitting a bandwidth-compressed signal as it is without using the transcoder, the present invention is featured by comprising means, which, when a terminal is moved to an area of another switching node in the second mode, inquires of the switching node about whether or not a setting information of the transcoder when the latter is inserted can be changed to a setting information in the second mode and changing it to the second mode on the basis of the inquiry.

The switching node is one opposing to the switching node of the radio access network for transmitting an audio signal as a bandwidth-compressed signal and the setting information may be a RFCI information in the AMR system.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 3:
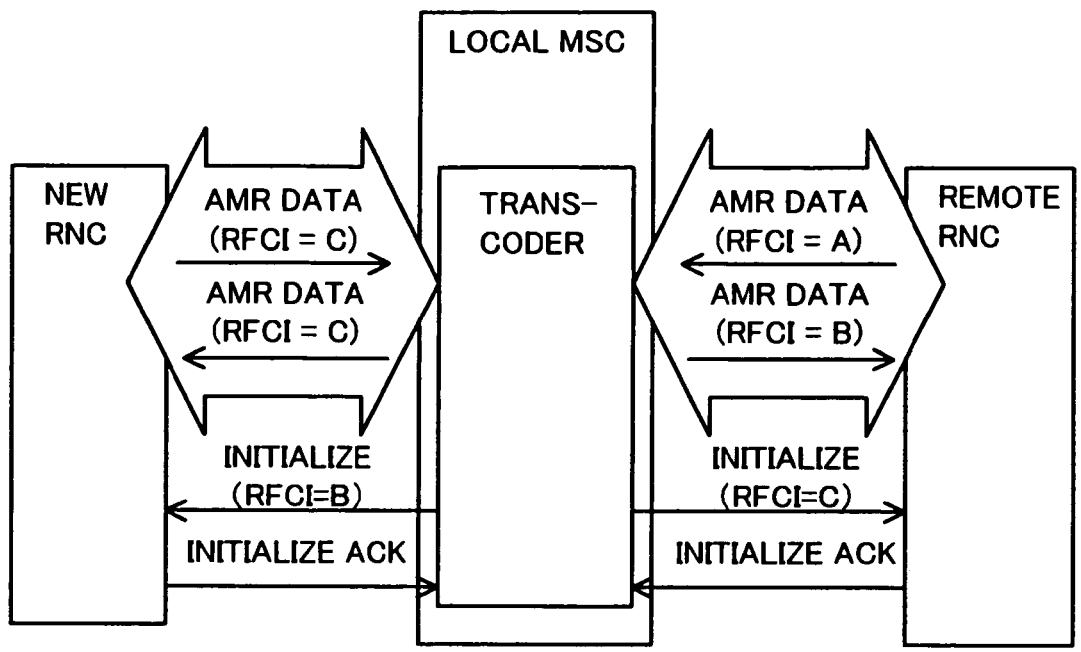
FIG. 3 shows an alignment operation of a transcoder.
Figure 4:
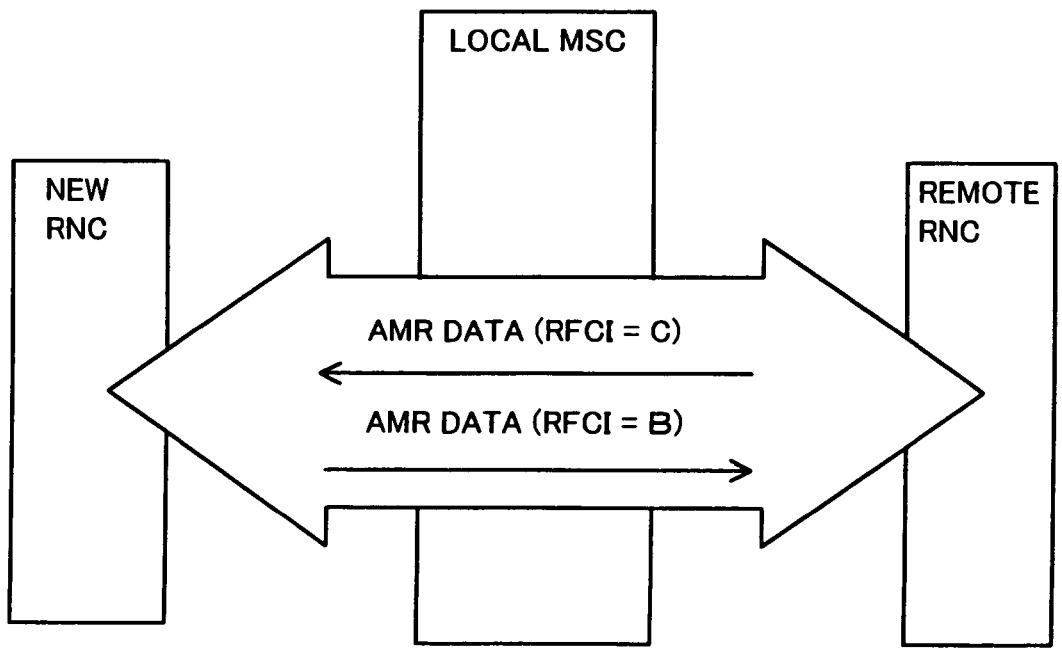
FIG. 4 shows a state when the TrFO connection is restored according to the present invention.
Figure 5:
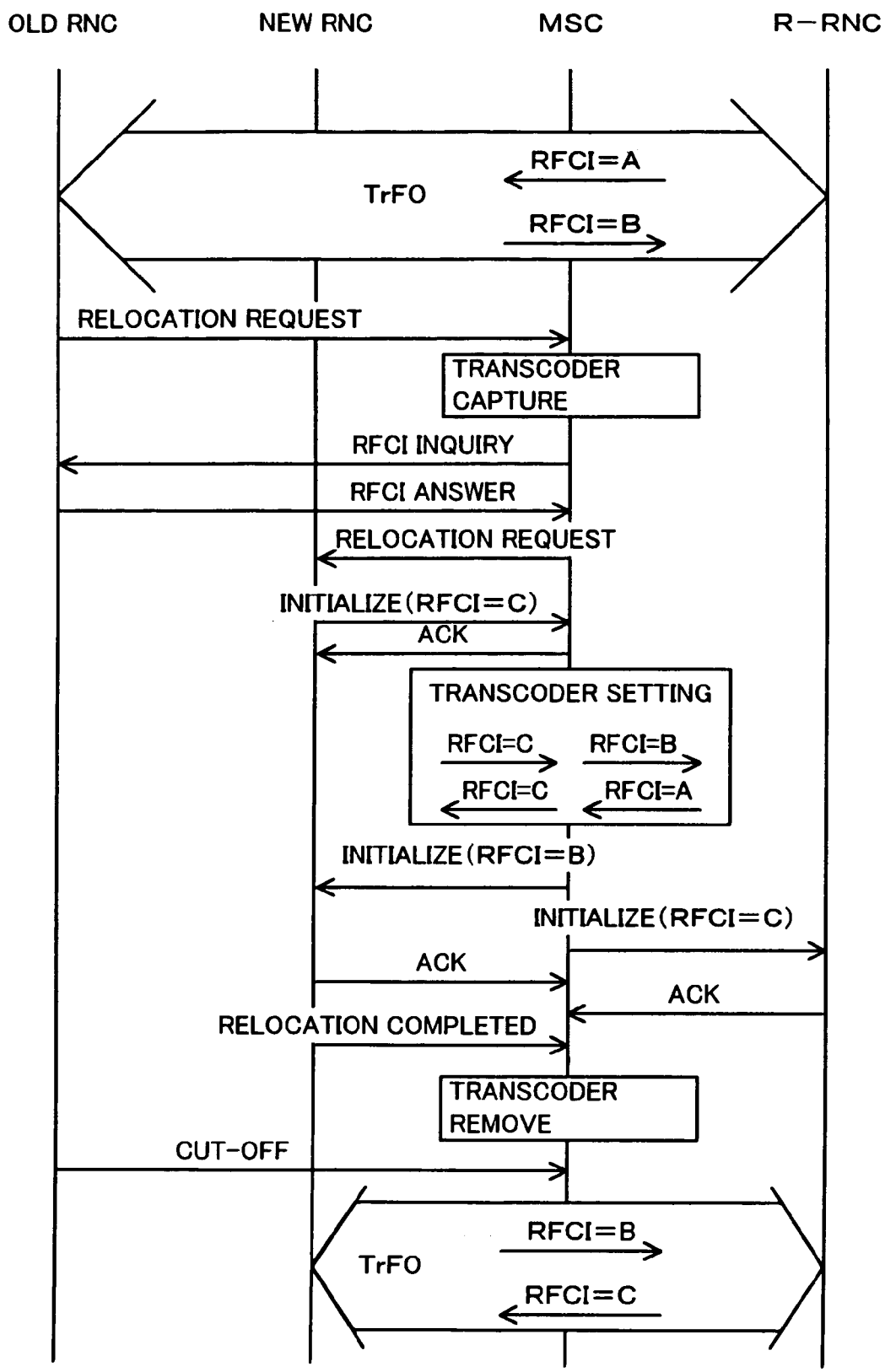
FIG. 5 is a flowchart showing a transcoder alignment operation according to the present invention.

A transcoder alignment operation according to the present invention will be described with reference to FIGS. 1 to 5, in which FIGS. 1 to 4 shows a transcoder alignment operation for returning to a TrFO operation by performing an inserting/removing operation when a terminal is moved to a new switching node RNC and FIG. 5 is a flowchart of the transcoder alignment operation shown in FIGS. 1 to 4.

Figure 1:
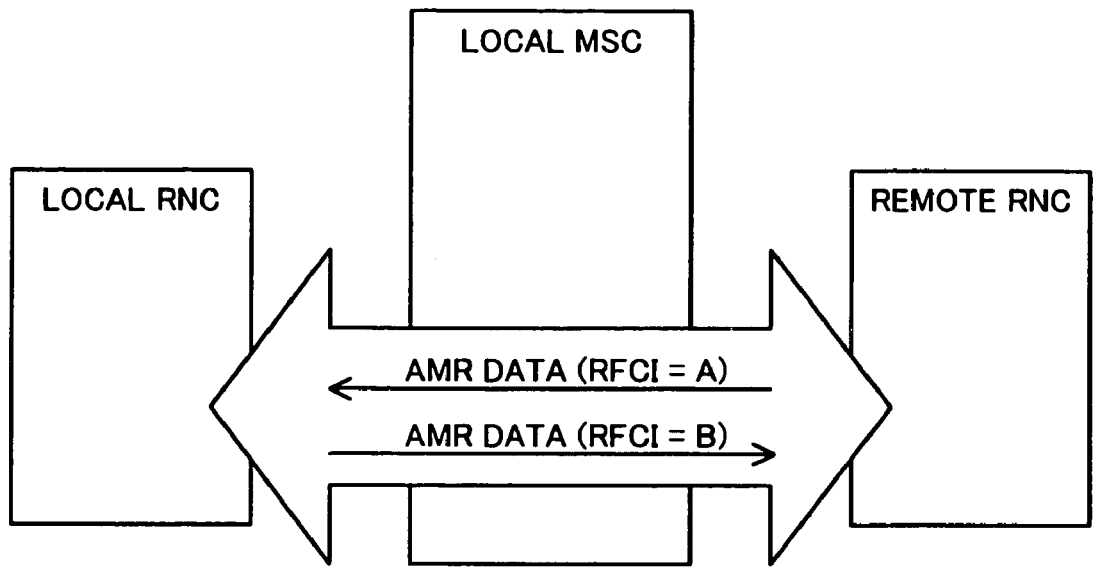
FIG. 1 shows a TrFO connection before relocation.

In FIG. 1, a TrFO connection is established between a local switching node RNC and a remote switching node RNC by bypassing a transcoder of a switching node MSC with using a RFCI information A of AMR data in an up link (leftward user bit stream in the drawing sheet) and a RFCI information B of AMR data in a down link (rightward user bit stream in the drawing sheet) according to a negotiation between a calling terminal and a called terminal.

Figure 2:
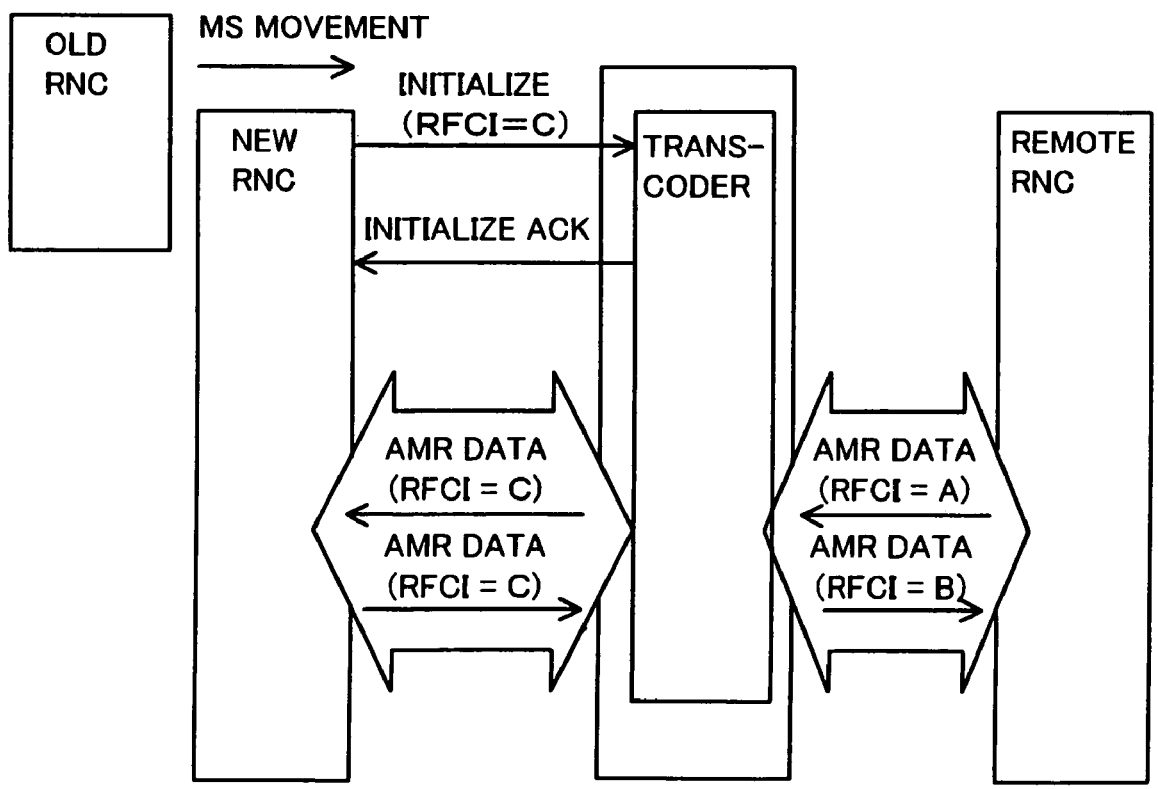
FIG. 2 shows an insertion of a transcoder at a time of relocation.

It is assumed here that the calling side terminal is moved to an area covered by a new switching node RNC of a radio access network as shown in FIG. 2.

In response to a relocation request from an old switching node RNC, the switching node MSC catches a transcoder and inquires of the old switching node RNC about the RFCI information of AMR in the currently used the TrFO connection. This is because the RFCI information currently used in the TrFO connection is determined by a negotiation between the users and the switching node MSC does not recognize it. After an acknowledge is acquired from the old switching node RNC, the switching node MSC performs a relocation request to a new switching node RNC. In response to the relocation request from the switching node MSC, the new switching node RNC performs an initialization request of the transcoder. In this step, the transcoder is inserted by initializing the transcoder between the switching node MSC and the new switching node RNC, as shown in FIG. 2. Since the initialization request from the new switching node RNC is performed by using a RFCI=C (RFCI information of AMR data sent up to the new switching node RNC is C), the switching node MSC inserts the transcoder by setting the RFCI=C as a setting value of the transcoder toward the new switching node RNC. Since the request from the new switching node RNC is the RFCI=C, RFCI on an input side of the transcoder is also set as the RFCI=C. Similarly, the transcoder is inserted for the remote side switching node SNC by using the RFCI=A on the up link side (input side) thereof and the RFCI=B on the down link side (output side) thereof on the basis of a response from the old switching node RNC.

Incidentally, in FIG. 2, the transcoder of the switching node MSC is shown as a single 2-input, 2-output type transcoder by considering the construction of the system in which the coding/decoding is performed on the input side as well as the output side with respect to the up link and the down link. Therefore, the transcoder may be constructed with two transcoders arranged back to back for performing a conversion of AMR data into a 64 kbps PCM signal and a conversion of a 64 kbps PCM signal into AMR data.

Considering the RFCI information on the input side of the transcoder and the RFCI information on the output side of the transcoder, the transcoder is not requested to perform a format conversion (coding/decoding processing) of AMR if the RFCI information on the input side thereof is the same as the RFCI information on the output side thereof. That is, it is enough for the switching node MSC to merely pass and transmit only AMR data (bandwidth-compressed audio signal), so that it is possible to avoid degradation of tone quality by merely removing the transcoder. If the RFCI information is common for the input side and the output side in both the up and down directions, the transcoder itself becomes unnecessary. Therefore, it is possible to return to the TrFO connection call by removing the transcoder.

Therefore, by considering the RFCI information on the output side of the transcoder, the switching node MSC requests the switching nodes RNC on the input side of the transcoder to initialize with using the output side RFCI information. In FIG. 3, the switching node MSC requests the new switching node RNC on the local side to initialize with using RFCI=B of AMR data outputted to the remote side switching node RNC. Further, the switching node MSC requests the remote side switching node RNC to initialize with using RFCI=C of AMR data outputted to the local side switching node RNC. When acknowledges for the initialization requests are received from the respective switching nodes RNC, the up direction becomes RFCI=C and the down direction becomes RFCI=B and the transcoder can be bypassed in both directions. Therefore, as shown in FIG. 4, the switching node MSC is returned to the TrFO connection for AMR data having RFCI=C in the up direction and RFCI=B in the down direction by removing the transcoder thereof.

Figure 6:
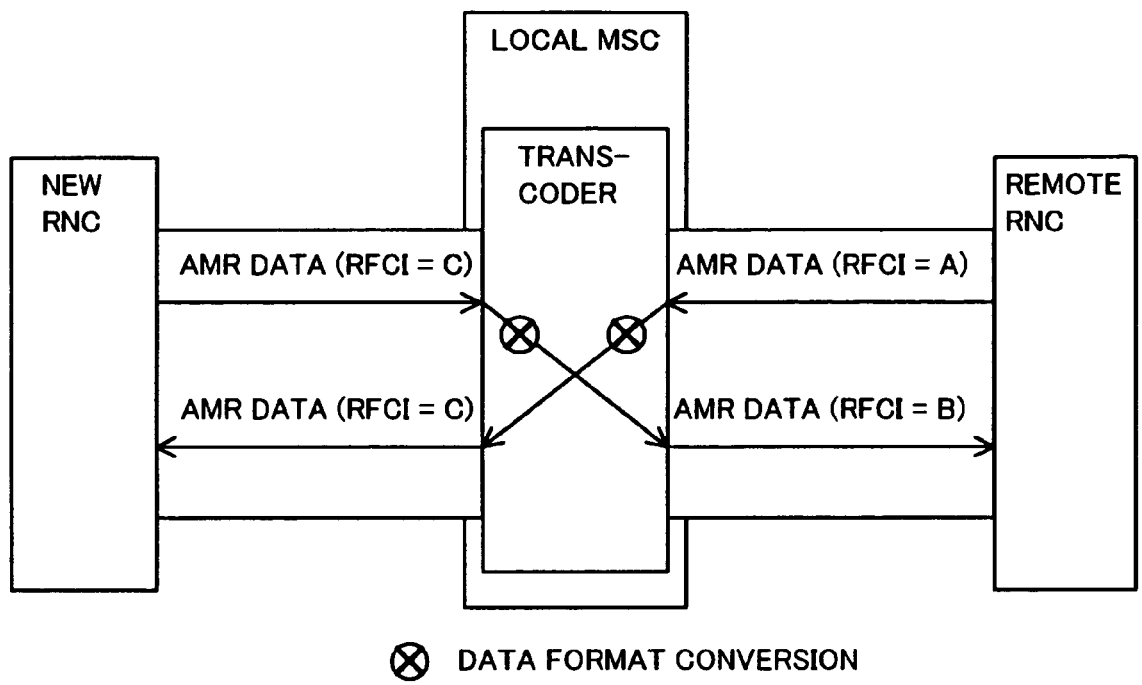
FIG. 6 shows a state where the transcoder alignment is failed.
Figure 7:
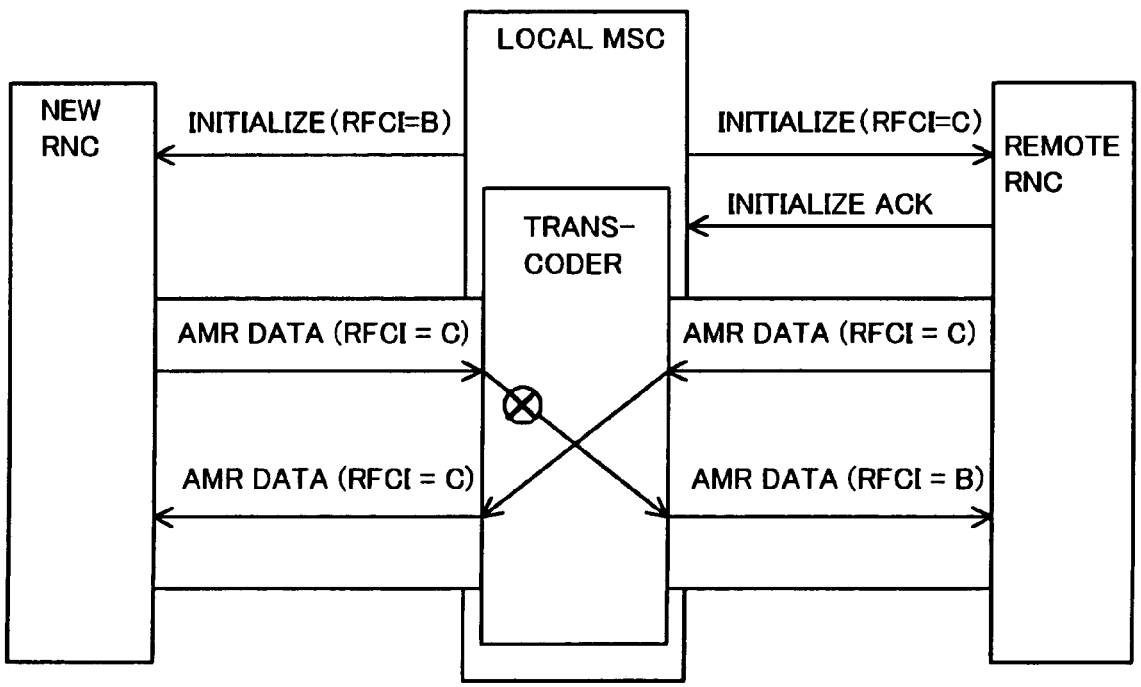
FIG. 7 shows a state where the transcoder alignment in one direction is successful.

FIGS. 6 and 7 shows the functions of the transcoder by symbolizing the states of connection thereof. The transcoder has the function of outputting AMR data from the local switching node RNC to the remote switching node RNC by converting the AMR data and the function of outputting AMR data from the remote switching node RNC to the local switching node RNC by converting the AMR data. These functions can be represented by symbolizing them as data format conversion functions. FIG. 6 shows an example in which the transcoder alignment is failed and the returning to the TrFO connection call is failed and FIG. 7 shows an example in which the transcoder alignment in the up direction is successful and the transcoder in the up direction is removed. Even in the case in which the transcoder in one direction is removed, it is possible to reduce the number of transcoders inserted into the transmission path to thereby improve the tone quality.

In a case where the called side terminal is moved and the relocation of the switching node RNC is performed, the above mentioned processing is performed in the remote side switching node MSC.

In a case where the calling side and the called side perform the relocation request of the respective switching nodes RNC, the calling side switching node MSC and the called side switching node MSC perform the processing shown in FIG. 1 to FIG. 5 within a time for which sound is discontinued, respectively. Therefore, there is no problem unless the transmitting side and the receiving side perform the relocation requests substantially simultaneously.

Figure 8:
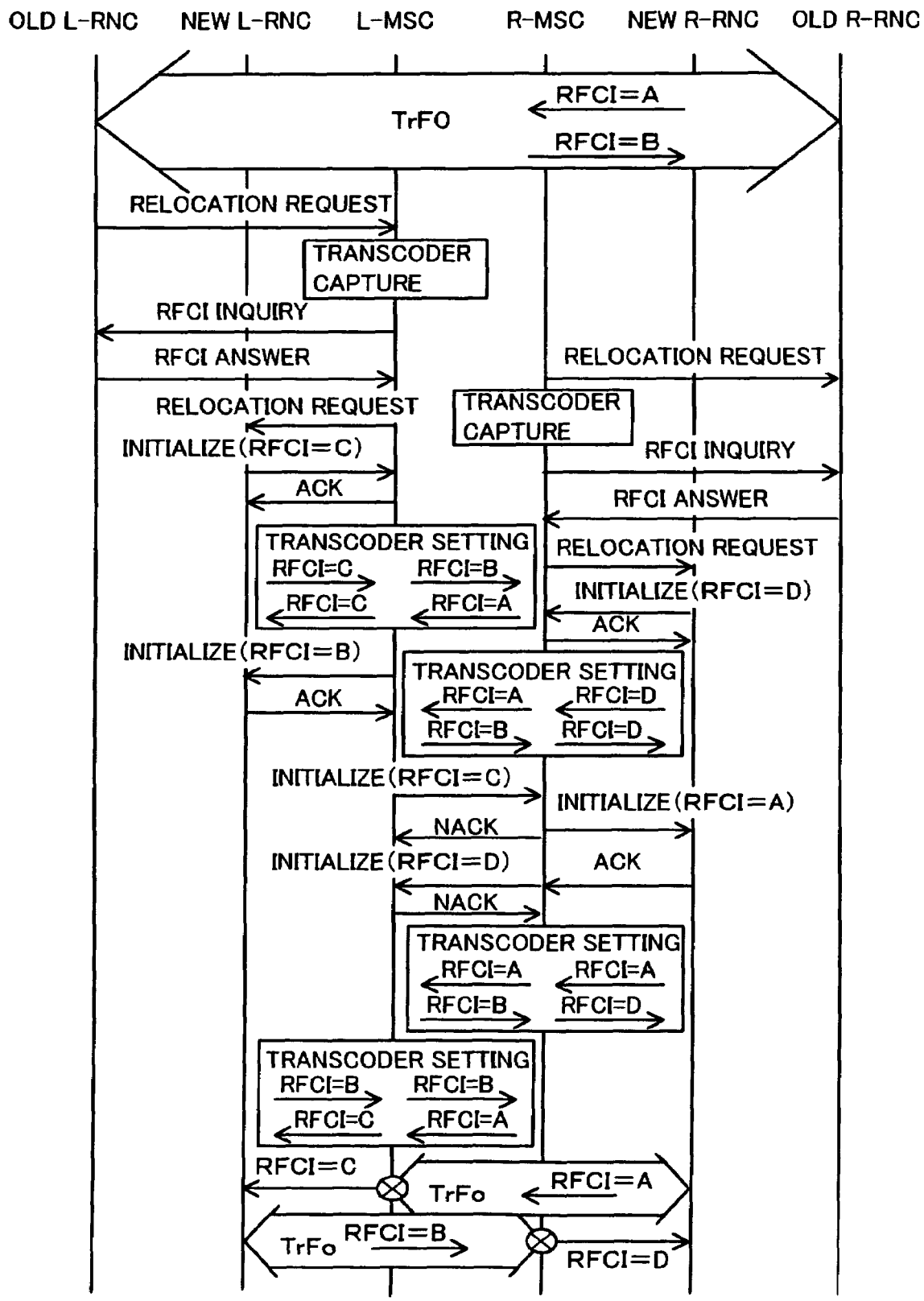
FIG. 8 is a flowchart showing the transcoder alignment operation when relocation requests occur substantially simultaneously.
Figure 9:
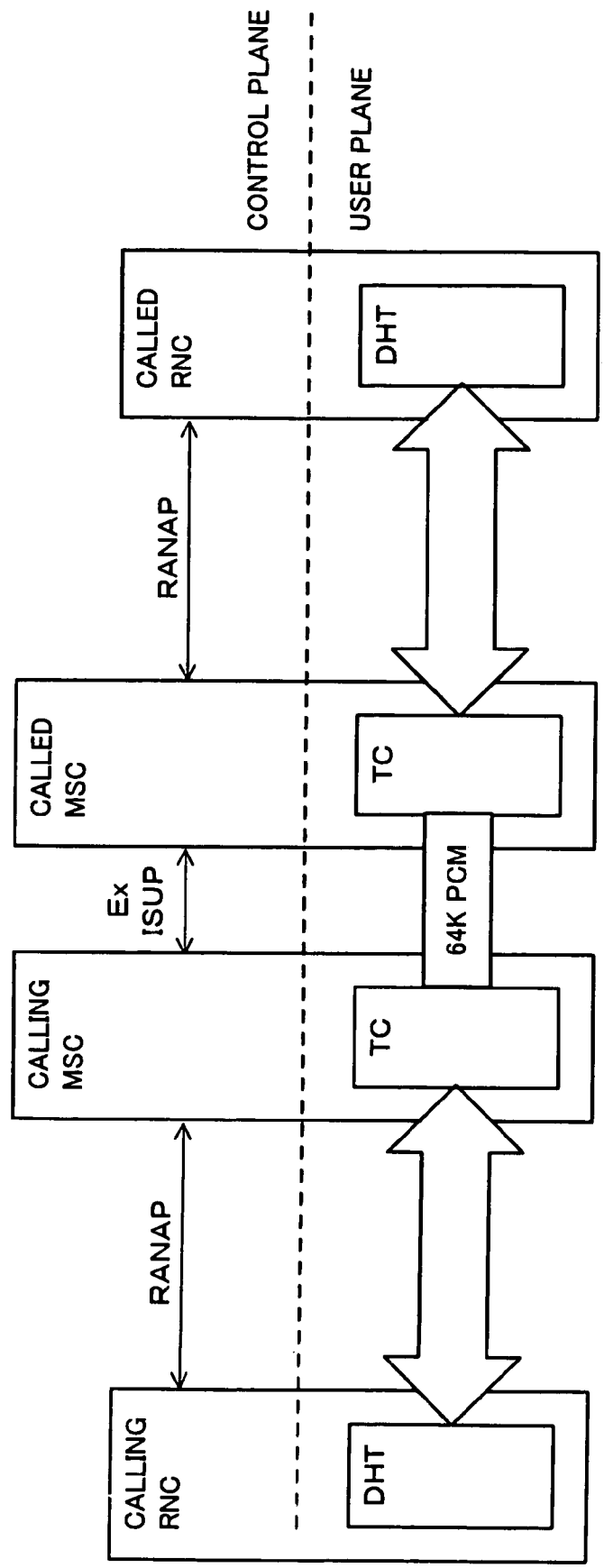
FIG. 9 shows a construction in the transcoder connection mode.
Figure 10:
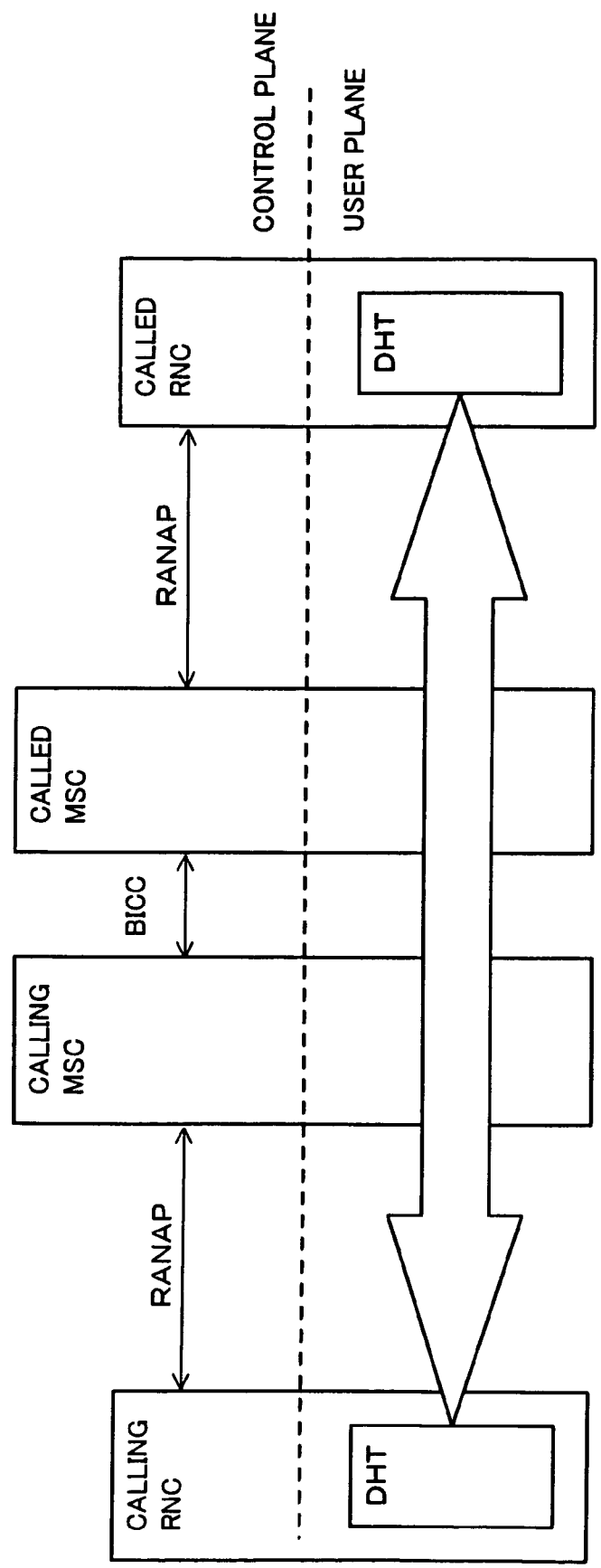
FIG. 10 shows a construction of the TrFO connection.
Figure 11:
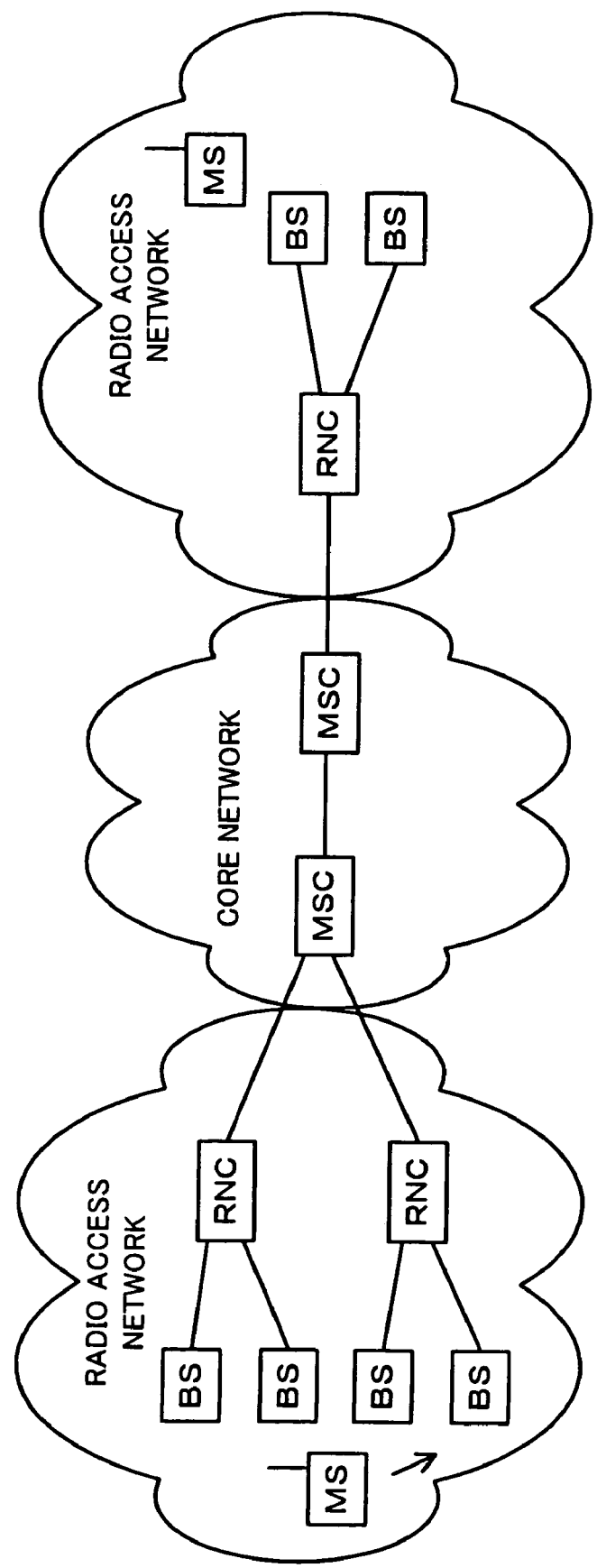
FIG. 11 shows a system construction of a mobile communication system to which the present invention is applied.

FIG. 8 shows a flowchart when the transmitting side and the receiving side request relocations substantially simultaneously. In this case, it is assumed that RFCI information used in the TrFO connection is RFCI=A in the up direction and RFCI=B in the down direction and the initialization requests from a new switching node RNC (L-RNC) on the transmitting side (local side) and a new switching node RNC (R-RNC) on the receiving side (remote side) are RFCI=C and RFCI=D, respectively. The local side switching node L-MSC and the remote side switching node R-MSC inquire of the old switching nodes L-RNC and R-RNC about RFCI information in use and set the transcoders on the basis of the acknowledges therefor and the initialization requests from the new switching nodes L-RNC and R-RNC. Then, the alignment processing is performed for the thus set transcoders.

In this case, the output of the switching node L-MSC to the core network side is RFCI=B. Therefore, when the switching node L-MSC inquires of the new switching node L-RNC on the transmitting side about the initialization request with using this RFCI information, the request is acknowledged. However, the initialization request to the remote side with using RFCI=C is rejected since the initialization request from the new switching node R-RNC on the receiving side is RFCI=D. Therefore, data in the down direction (rightward direction) becomes RFCI=B in the switching node L-MSC and the transcoder can be removed for the data in the up direction, so that it is possible to return to the TrFO connection. As to the up direction (leftward direction), data of RFCI=A is converted into AMR data of RFCI=C by the transcoder and transmitted. Similarly, in the switching node R-MSC on the receiving side, the initialization request for making the up side data for the new switching node R-RNC RFCI=A is acknowledged and the initialization request for making the down side data for the local side RFCI=D is rejected. Therefore, the RFCI information on the input side of the transcoder is the same as that on the output side thereof in the up direction, so that the transcoder is removed. For the down direction, data of RFCI=B is converted into data of RFCI=D by the transcoder and transmitted.

This case is the same as the case shown in FIG. 7 in which the alignment in one direction is failed and the transcoder is inserted in one direction and one transcoder is removed in the local side switching node MSC and one transcoder is removed in the remote side switching node MSC, so that the number of transcoders inserted into the transmission path can be reduced.

As described hereinbefore, according to the present invention, tone quality in one or both directions, which is degraded by insertion of a transcoder in the relocation of a switching node of a radio access network, can be improved by removing the transcoder by performed the alignment processing of the setting information of the transcoder. Further, since the TrFO connection becomes possible by the alignment processing of the setting information of the transcoder, it is possible to reduce the number of transcoders provided in the switching node of the core network to thereby reduce the cost of the communication system.

What is claimed is;

1. A method used in a communications system including a switching node, a first radio access switching node, and a second radio access switching node, said method comprising:
   inserting a transcoder in said switching node before performing a relocation from said first radio access switching node to said second radio access switching node;
   initializing said second radio access switching node so that compression coding information from said second radio access switching node becomes the same as compression coding information from said first radio access switching node if the compression coding information is not the same; and
   removing said transcoder after making the compression coding information the same.

2. The method according to claim 1, wherein said switching node is in a core network.

3. The method according to claim 2, wherein said switching node comprises a mobile switching center (MSC).

4. The method according to claim 2, wherein said switching node comprises a media gateway server (MGW).

5. The method according to claim 1, wherein said first and second switching nodes each comprises a radio network controller (RNC).

6. The method according to claim 1, wherein said transcoder is applicable to adaptive multi-rate (AMR) codec.

7. The method according to claim 1, wherein said compression coding information includes RFCI (Rab sub-Flow Combination Indicator) information.

8. The method according to claim 1, wherein said mobile terminal communicates under a transcoder-free operation (TrFO) after a removal of said transcoder.

9. The method of claim 1, wherein said communication system performs a transcoder free operation (TrFO).

10. A method used in a switching node, comprising:
    inserting a transcoder in said switching node before performing a relocation from a first radio access switching node to a second radio access switching node;
    initializing said second radio access switching node so that compression coding information from said second radio access switching node becomes the same as compression coding information from said first radio access switching node if the compression coding information is not the same; and
    removing said transcoder after making the compression coding information the same.

11. A communications system, comprising:
    a switching node;
    a first radio access switching node that covers a first area; and
    a second radio access switching node that covers a second area,
    wherein said switching node comprises a transcoder,
    wherein said transcoder is inserted in said switching node before performing a relocation from said first radio access switching node to said second radio access switching node, and
    wherein said switching node initializes said second radio access switching node so that compression coding information of said second radio access switching node becomes the same as compression coding information from said first radio access switching node if the compression coding information is not the same and removes said transcoder after making the compression coding information the same.

12. The communications system according to claim 11, wherein said switching node is in a core network.

13. The communications system according to claim 12, wherein said switching node comprises a mobile switching center (MSC).

14. The communications system according to claim 12, wherein said switching node comprises a media gateway server (MGW).

15. The communications system according to claim 11, wherein said first and second radio access switching nodes each comprises a radio network controller (RNC).

16. The communications system according to claim 11, wherein said transcoder is applicable to adaptive multi-rate (AMR) codec.

17. The communications system according to claim 11, wherein said compression coding information comprises RFCI (Rab sub-Flow Combination Indicator) information.

18. The communications system according to claim 11, wherein said mobile terminal communicates under a transcoder-free operation (TrFO) after a removal of said transcoder.

19. A communications system, comprising:
    switching means for carrying out a switching or gateway switching function;
    first radio access switching means for switching for a first area; and
    second radio access switching means for switching for a second area, wherein said switching means comprises transcoding means for transcoding a signal, wherein said transcoding means is inserted in said switching means before performing a relocation from said first radio access switching means to said second radio access switching means, and wherein said switching means initializes said second radio access switching means so that compression coding information from said second radio access switching means becomes the same as compression coding information from said first radio access switching means if the compression coding information is not the same, and removes said transcoding after making the compression coding information the same.

20. A switching node, comprising:

a transcoder, wherein said transcoder is inserted in a switching node before performing a relocation from a first radio access switching node to a second radio access switching node, and wherein the switching node initializes said second radio access switching node so that compression coding information from the second radio access switching node becomes the same as compression coding information from said first radio access switching node if the compression coding information is not the same and removes said transcoder after making the compression coding information the same.

21. A switching node, comprising:

switching means for carrying out a switching or gateway switching function; and transcoding means for transcoding a signal, wherein said transcoding means is inserted in the switching node before performing a relocation from a first radio access switching node to a second radio access switching node, and wherein the switching node initializes said second radio access switching node so that compression coding information from said second radio access switching node becomes the same as compression coding information from said first radio access switching node if the compression coding information is not the same and removes said transcoding means after making the compression coding information the same.

* * * * *